7238X
A. W. CARREL.
Rotary Churn.
Patented Oct. 25, 1832.
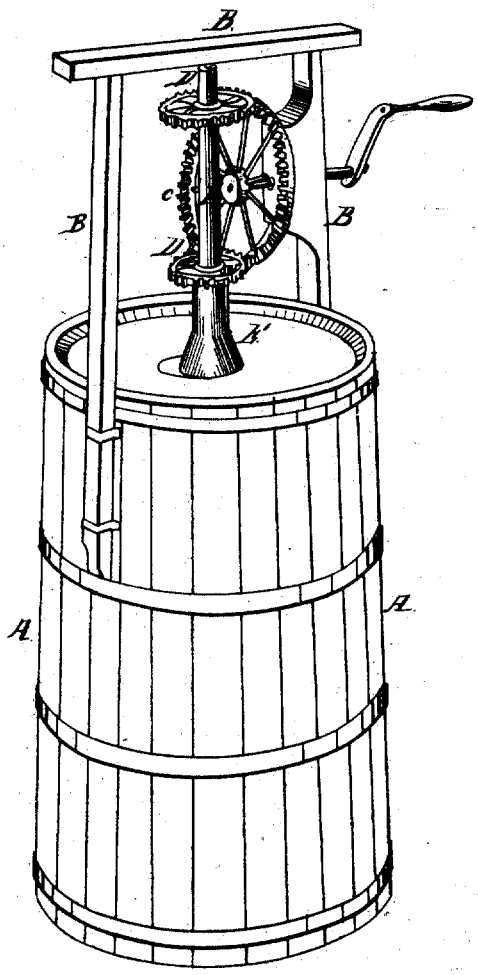
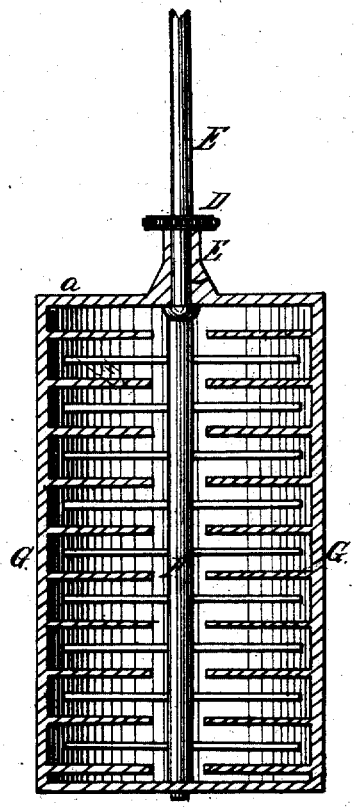
THE NORRIS PETERS CO., PHOTO-LITHO., WASHINGTON, D. C.

7238x Oct. 25. 1832

Anthony W Carrel of Granville Ohio

Letters Patent

The Schedule referred to in these Letters Patent and making part of the same containing a description in the words of the said Anthony W Carrell himself of his improvement in the Churn To all whom these presents shall come. Be it known that I. Anthony W Carrel of Granville in the County of Licking and State of Ohio have invented a new and useful improvement in the Churn for making manufacturing or extracting Butter from milk or cream. and the following is a full and exact description of the said machine as invented or improved by me. I make a small cask sufficiently tight to contain the milk or cream, in which is placed the dasher, and is made and constructed as follows. I make a frame of a square form sufficiently small to revolve in the cask or churn, in the side pieces of the frame I place at a regular distance small pieces of timber pointing inward the ends of which should be far enough separate to admit a shaft of sufficient strength, then I pass small pieces of timber thro' the shaft, so constructed as to pass between the pieces in the frame, the shaft being of sufficient length to pass thro the top of the churn and a hub or hollow piece of timber and constructed so as to have a small shoulder below the lid of the churn, and made fast to the frame, on the hub I place a small spur wheel, then attach a small spur wheel of the same diameter near the end of the shaft above. the action is given by placing a [illegible] wheel of something like twice the diameter of the spur wheels on a frame attached to the outer side of the churn so as to be moveable.

The face wheel is made to revolve by a crank. the top and bottom of the shaft. should be pointed, the bottom to work in the centre of the churn, and the top through the top piece of the outer frame. After churning or breaking the milk or cream, to gather the butter, I attach the frame and shaft when the marks of both are together by placing a small pin thro the hub & shaft above the churn Drawing 7238x Oct 25, 1832

I then throw the upper upper wheel out of gear by means of a spring
I claim as my invention the principle of the darker, and the manner
in which it is made to revolve Witnesses
Lyd. Wilmerton
Wm. D. Wright
Wm. Gouit Anthony W. Carroll (Patented October 25. 1832) (4 1/2 Mos)